No. 653,566. Patented July 10, 1900.
H. AIKEN.
ROLLING MILL.
(Application filed May 2, 1896.)
(No Model.) 9 Sheets—Sheet 1.

WITNESSES
INVENTOR
Henry Aiken

No. 653,566. Patented July 10, 1900.
H. AIKEN.
ROLLING MILL.
(Application filed May 2, 1896.)
(No Model.) 9 Sheets—Sheet 2.

WITNESSES
Thomas W. Bakewell

INVENTOR
Henry Aiken

No. 653,566. Patented July 10, 1900.
H. AIKEN.
ROLLING MILL.
(Application filed May 2, 1896.)
(No Model.) 9 Sheets—Sheet 3.

WITNESSES
INVENTOR
Henry Aiken

No. 653,566. Patented July 10, 1900.
H. AIKEN.
ROLLING MILL.
(Application filed May 2, 1896.)
(No Model.) 9 Sheets—Sheet 4.

WITNESSES
INVENTOR

No. 653,566. Patented July 10, 1900.
H. AIKEN.
ROLLING MILL.
(Application filed May 2, 1896.)
(No Model.) 9 Sheets—Sheet 7.

WITNESSES
INVENTOR

UNITED STATES PATENT OFFICE.

HENRY AIKEN, OF PITTSBURG, PENNSYLVANIA.

ROLLING-MILL.

SPECIFICATION forming part of Letters Patent No. 653,566, dated July 10, 1900.

Application filed May 2, 1896. Serial No. 590,041. (No model.)

*To all whom it may concern:*

Be it known that I, HENRY AIKEN, of Pittsburg, in the county of Allegheny and State of Pennsylvania, have invented a new and useful Improvement in Rolling-Mills, of which the following is a full, clear, and exact description, reference being had to the accompanying drawings, forming part of this specification, in which—

Figs. 1$^a$ and 1$^b$ are diagrams illustrating the course of the metal through the mill. Fig. 6 is a vertical section on the line VI VI of Fig. 5, showing the mechanism which I prefer to employ for tipping the shifter, and thus transferring the metal from the rollers of one level to those of a lower level.

Figure 1:
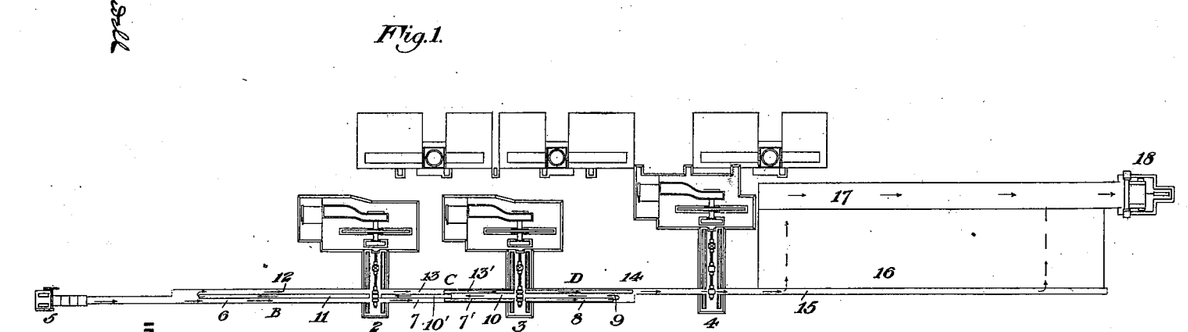
Figure 1 is a diagram plan view of my improved rolling-mill, shown on a smaller scale than are the other figures.
Figure 1A:
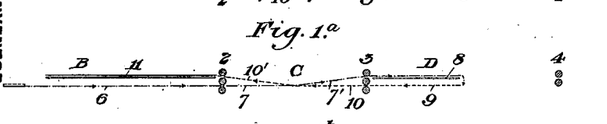
Figure 1B:
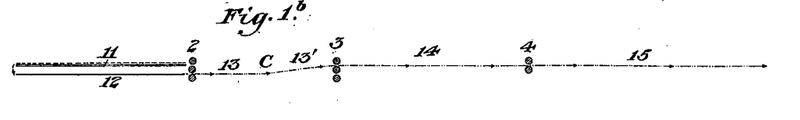

I shall first give a general description of the course of the metal through the rolling-mill plant shown in Fig. 1, as indicated by the diagram Figs. 1$^a$ and 1$^b$, and shall then explain in detail the construction and operation of the parts of the apparatus. I premise, however, that the claims for the apparatus included in this specification are not limited to use in connection with a plant arranged in the precise manner illustrated in these diagram figures, but that the same may be modified in many ways by the skilled rolling-mill constructor.

The arrows and dotted lines in Figs. 1, 1$^a$, 1$^b$ illustrate the course of the metal through the mill, which comprises two sets of three-high rolls 2 3, each having three lower and three upper passes and which revolve in opposite directions, and a two-high set of rolls 4, having a single pass for the finishing of the metal. In Fig. 1 I do not show the feed-rollers by which the metal is fed to the rolls nor the shifters by which it is received and moved laterally, as the scale on which the drawings is made is too small to permit of their illustration. I merely indicate them in Fig. 1 by parallel lines.

The metal to be rolled having been properly heated is cut into the desired length at the blooming-mill shears 5, and the sheared piece is carried along a feed-roller surface 6 to the lower pass of the rolls 2 between the bottom and middle roll. Thence it passes along a feed-roller surface or line 7, the final portion 7' of which is inclined upwardly, to the second pass, which is between the middle and top roll of the rolls 3. Thence the metal emerges upon a shifter 8, which by mechanism hereinafter described shifts it laterally and deposits it upon a feed-roller surface 9, by which it is carried to the third pass between the bottom and middle roll of the rolls 3. Thence it passes along a feed-roller line 10, the latter half 10' of which is upwardly inclined, to the fourth pass between the middle and top rolls of the rolls 2. Thence it passes onto a shifter 11 similar in construction to the shifter 8, by which it is shifted laterally and deposited at a lower level upon a feed-roller line 12, by which it is then conveyed in a reverse direction through the fifth pass between the middle and bottom rolls of the rolls 2. Thence it passes on a feed-roller line 13, the latter half 13' of which is upwardly inclined, to the sixth pass between the top and middle rolls of the rolls 3. Thence it is delivered upon a feed-roller line 14, by which it is carried to the finishing-pass of the rolls 4. Thence it is delivered upon a feed-table 15, whence it is transferred by transfer mechanism 16 to the feed-table 17 of shears 18, at which it may be cut into suitable lengths.

The principle of my invention may be applied to mills for rolling many different kinds of product. I have especially designed it for mills for rolling metal plates for skelp-iron, &c.; but by suitable modifications it may be adapted to bar-mills, rail-mills, &c.

Within the invention, broadly considered, the rolls 2 3 may be two-high rolls, the metal being carried over the upper rolls idly and thence carried back between the rolls. The principle of the invention may also be extended by applying it to mills having a greater or less number of rolls or roll-passes than I have shown in the drawings.

Figure 2:
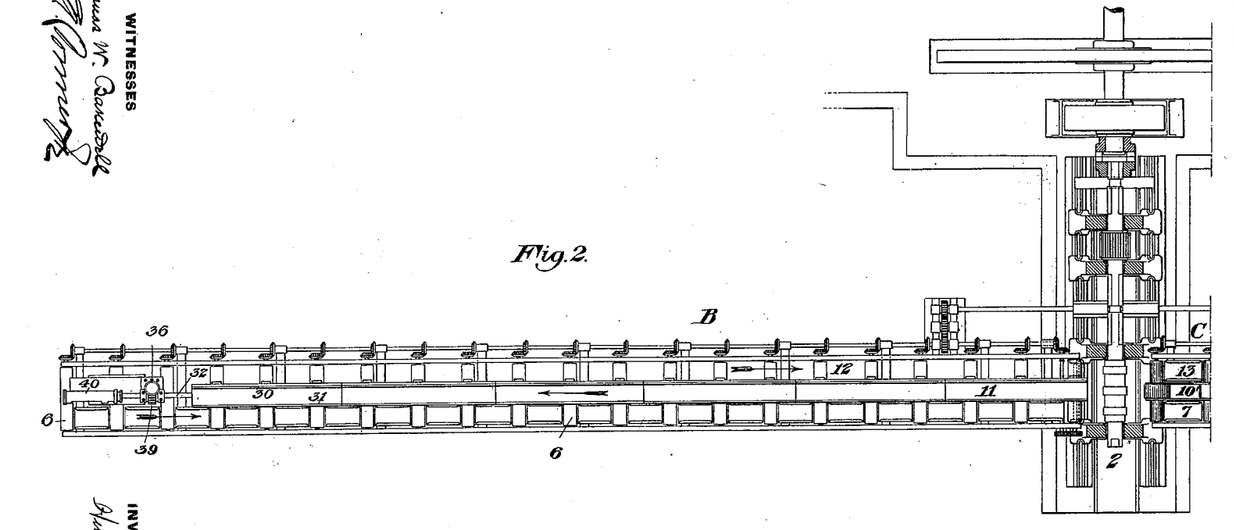
Figs. 2, 2$^a$, and 2$^b$ are parts of a single figure, which should be read by viewing the sheets end to end in the order above stated. They show in sectional plan view the three sets of rolls illustrated in Fig. 1 and in plan the intermediate feed-tables and shifting devices and the transfer mechanism by which the rolled pieces of metal are finally transferred to the shears.
Figure 2A:
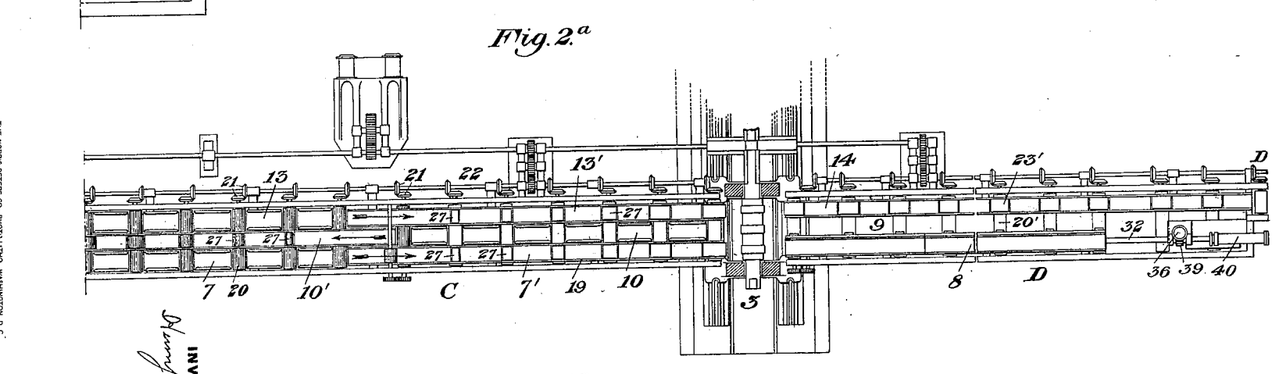
Figures 2B, 3B:
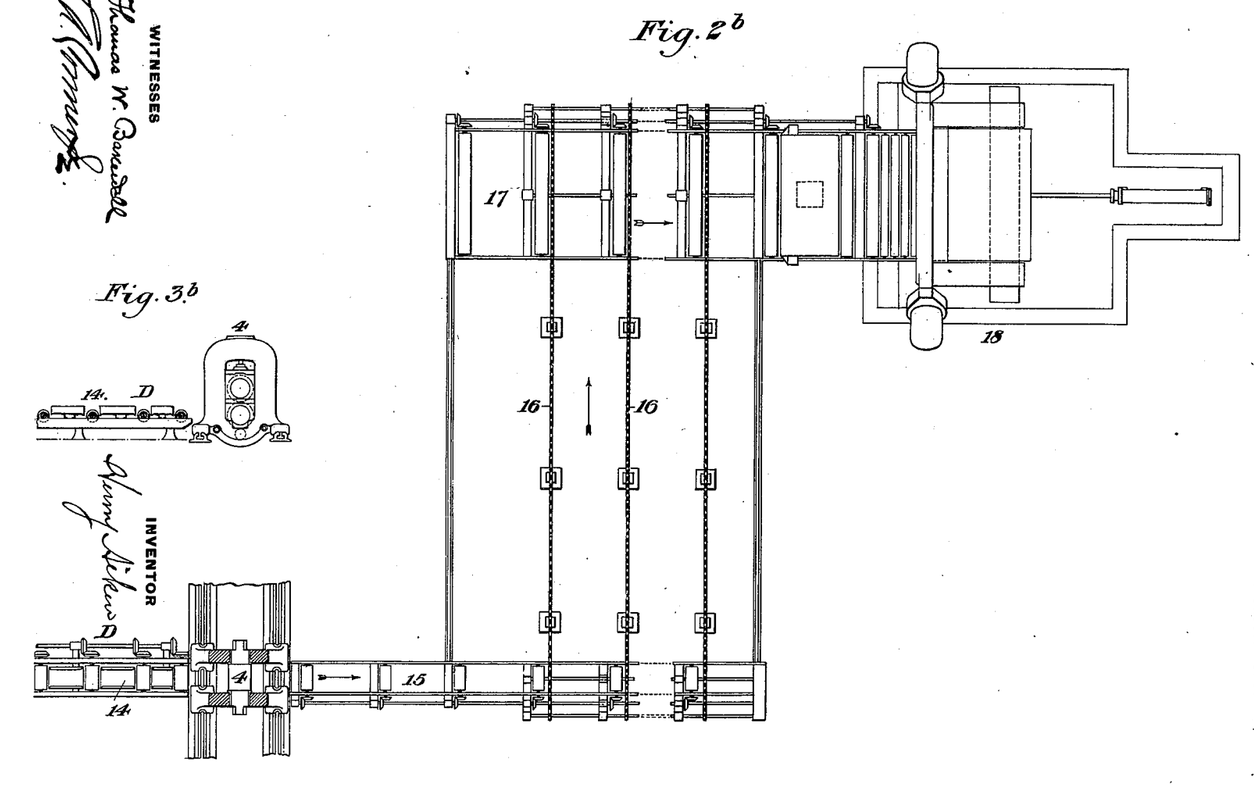
Figure 3:
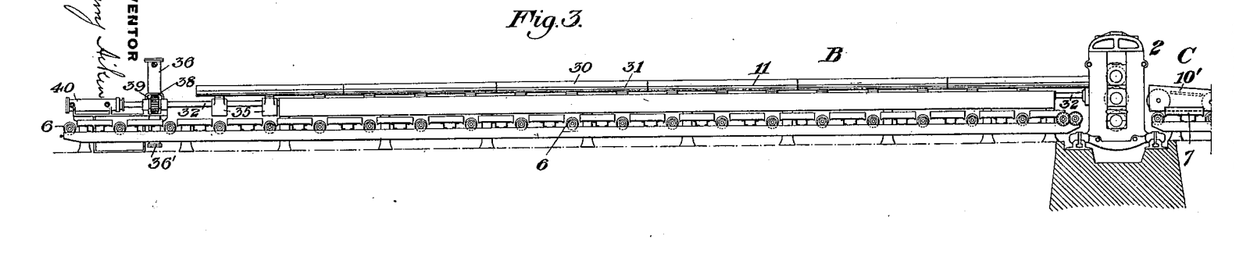
Figs. 3, 3$^a$, and 3$^b$ are also parts of a single figure, showing the apparatus in side elevation.
Figure 3A:
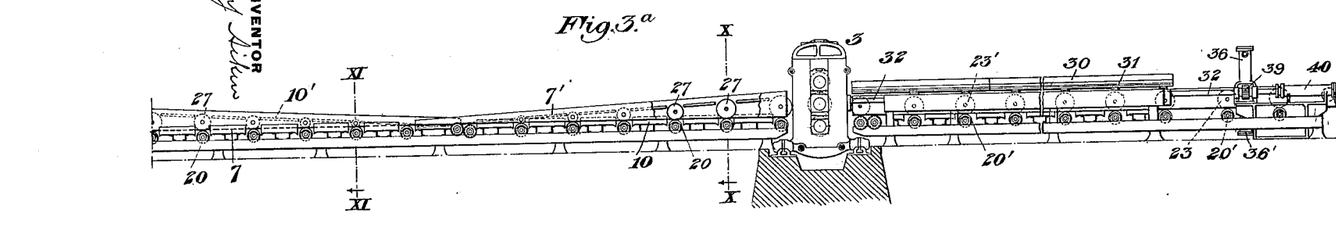
Figure 8:
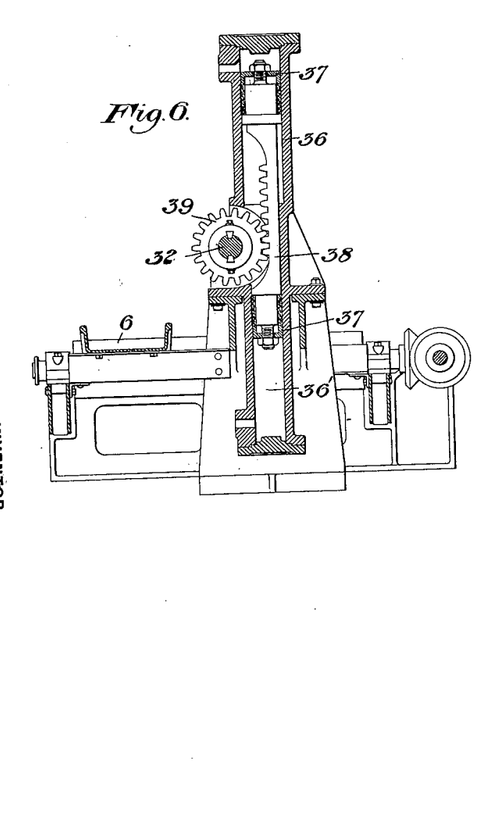
Fig. 8 is a plan view of part of the feed-table shown at the left of Fig. 3$^a$, but on a much larger scale.
Figure 9:
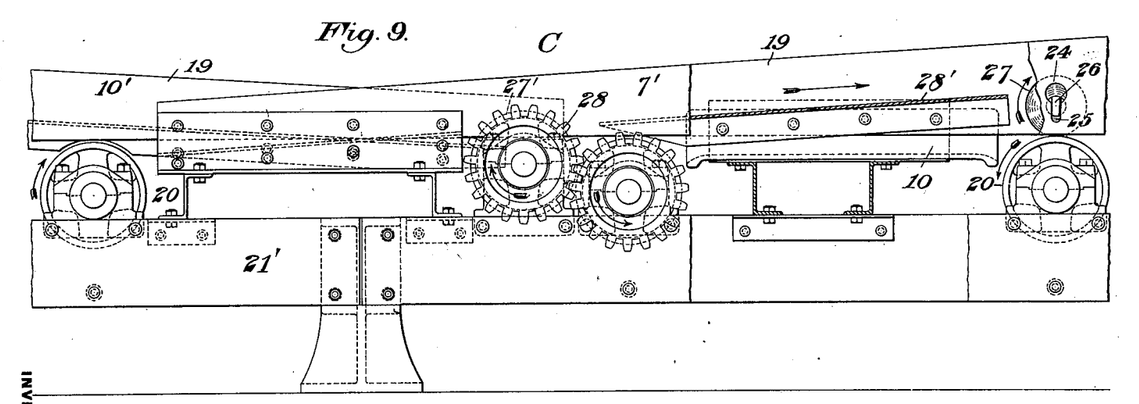
Fig. 9 is a side elevation of Fig. 8, and Figs. 10 and 11 are vertical cross-sections on the lines X X and XI XI of Fig. 3$^a$.
Figure 10:
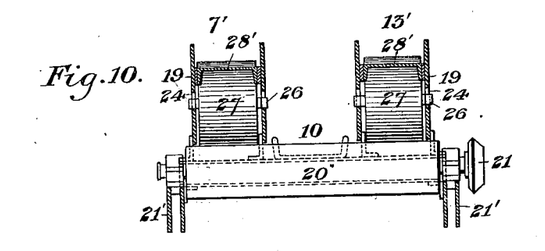
Figure 11:
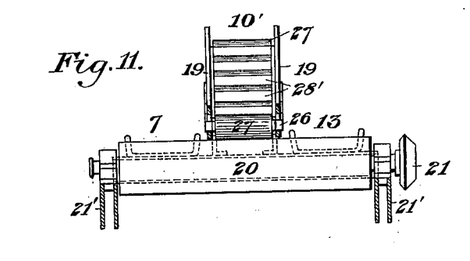

The feed-tables which I employ are stationary—that is, they do not move vertically nor tip, but they afford means by which along a single table the metal undergoing the rolling operation may be moved in both directions and transferred from the lower passes of the rolls to the upper passes, and vice versa. I show three of such tables—B in Fig. 2 and C and D in Fig. 2ª. The table C in Fig. 2ª is divided into three parts 7, 10, and 13 by parallel side plates 19. A series of rollers 20, arranged in the same horizontal plane, extend across the table, being journaled in bearings in the side frames 21' thereof, and at their ends are driven by gearing 21 from a counter-shaft 22, said gearing being arranged, as shown in Fig. 2ª, so that the rollers 20 at the parts of the table marked 7 10' 13 shall rotate in the reverse direction relatively to the rollers 20 at the parts marked 7' 10 13'. The surfaces of the rollers 20 are exposed and constitute the feed mechanism at the parts of the tables 7, 13, and 10, which are horizontal in direction; but to constitute the other parts 7', 13', and 10' I employ short frictionally-driven rollers 27, journaled on shafts 26 between the side plates 19, Figs. 8 and 9, and bearing upon the rollers 20, by which they are driven frictionally. The inclination of the surfaces of the parts of the table last mentioned is secured by employing in each series frictionally-driven rollers of progressively-increasing diameters from the middle of the table toward the rolls, Fig. 3ª, and I journal said rollers by the device shown in Fig. 9—i. e., the rollers are placed between the side plates 19, (which for this purpose incline upwardly, as shown in Fig. 3ª) opposite to holes 24 in said plates, from which extend vertical key-slots 25. Shafts 26 are inserted through the holes 24 and through the rollers and are suffered to drop in the slots 25, so that their squared ends shall fit in and be held by the slots. The rollers 27 then revolve on the shafts 26 in opposite directions from the rollers 20, by which they are supported and driven, and to facilitate their driving I machine their surfaces and the surfaces of those parts of the rollers 20 against which they bear.

All the rollers of the table B are on the same level, and consequently only one set of positively-driven rollers and no frictionally-driven rollers are employed. The table D, however, has two parts 9 and 14, comprising horizontal roller-surfaces at different levels, and to constitute said parts I employ positively-driven feed-rollers 20', which extend across the table and are exposed at the part 9 to constitute the roller mechanism thereof, and short rollers 23', which rest upon and are driven frictionally by the rollers 20' to constitute the roller mechanism of the part 9; but as this part of the table is entirely horizontal all the frictionally-driven rollers may be of the same diameter. Otherwise they are constructed and journaled in the manner explained above with reference to the frictionally-driven rollers 27.

At the foot of the part 7' of the table C, where a feed-roller is needed whose surface shall be too little above the level of the adjacent roller 20 to be driven frictionally therefrom, I journal such roller 27' in the side plates of the table and connect it by gearing 28 with the adjacent feed-roller 20. Plates 28' are set in the parts of the tables between the several rollers of each line to close the gaps between the sides of the rollers.

Figure 7:
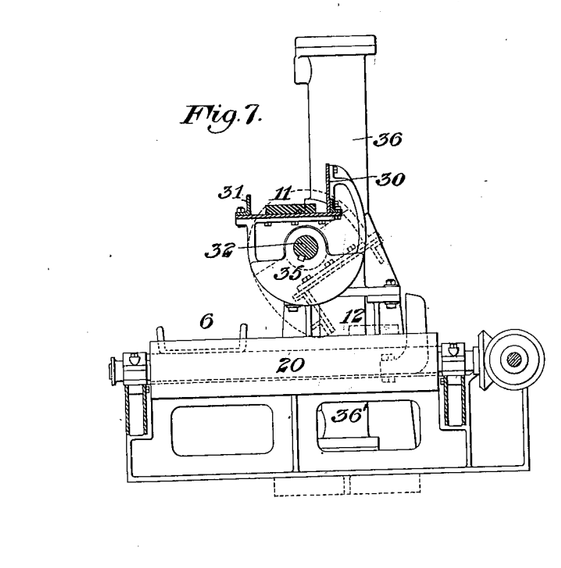
Fig. 7 is a side elevation thereof, the shifter being shown in section on the line VII VII of Fig. 5 and the manner of operation being illustrated by dotted lines.

The shifters 8 and 11, by which the metal is moved laterally on the table, are constructed as shown in Figs. 4, 5, 6, and 7. Each shifter is of trough form, having one side or shelf 30, of considerable height, preferably greater than the other side 31, and is keyed by a yoke 35 to a shaft 32, which extends above the table, parallel therewith, and is journaled at intervals in standards 33. The yokes 35 are preferably provided with counterbalancing weighted portions, as shown in Fig. 7. For the purpose of turning the shaft on its longitudinal axis I employ rotating mechanism, which in its preferable form comprises two upright cylinders 36 36', set vertically in the same line, with their open ends directed toward each other and having pistons 37 37, connected by a rack 38, meshing with a pinion 39 on the shaft. The cylinder 36 is the actuating-cylinder, and water under pressure is admitted to it only when it is desired to turn the shifter. The cylinder 36' is a counterbalancing-cylinder, being of somewhat smaller diameter, and pressure is constantly maintained therein, so that when the cylinder 36 is disconnected from the pressure and connected with the exhaust the cylinder 36' will move the pistons so as to displace the water from the cylinder 36 to right the shifter and bring it again into and to hold it in upright position.

By reciprocating the rack 38 the shaft and the shifter keyed thereto may be turned through an arc of one hundred and twenty degrees and back again, as shown by dotted lines in Fig. 7.

Figure 4:
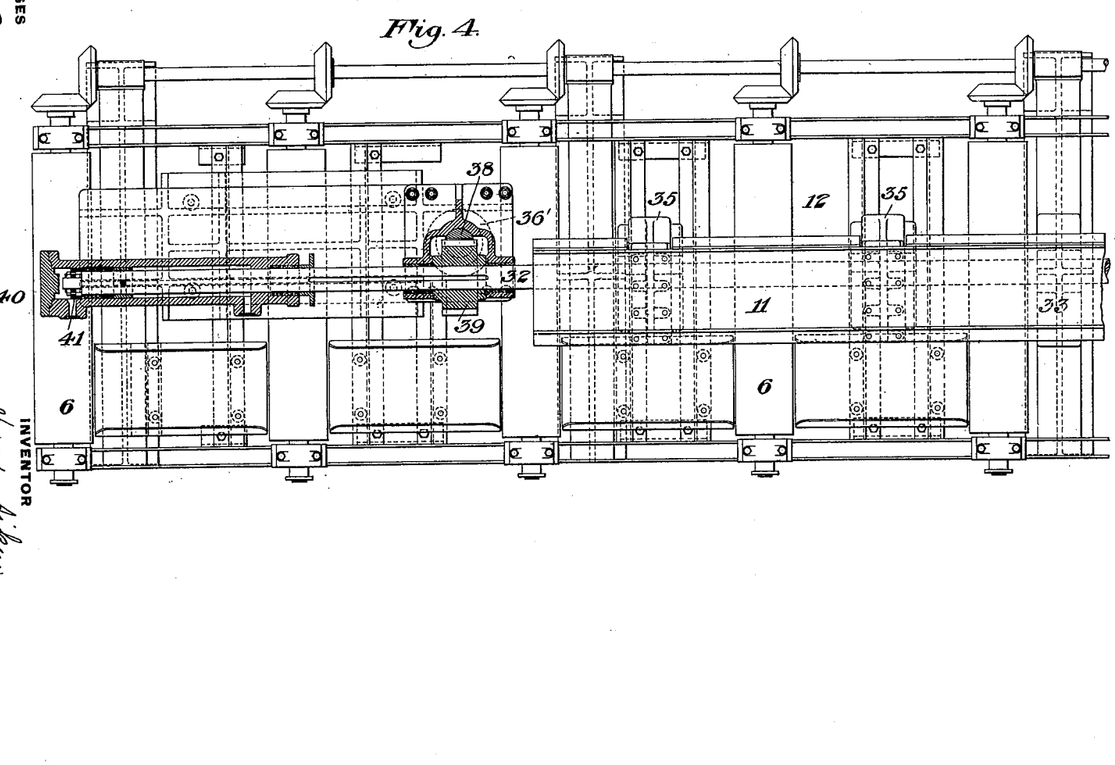
Fig. 4 is a sectional plan view on the line IV IV of Fig. 5, showing the parts on a larger scale.
Figure 5:
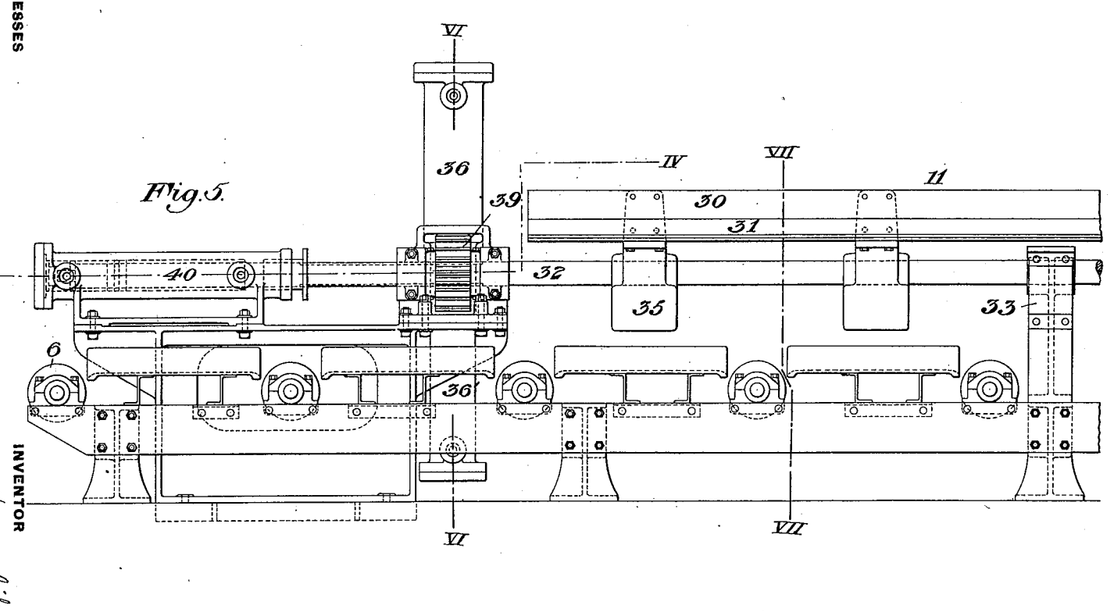
Fig. 5 is a side elevation thereof.

For the purpose of moving the shifter lengthwise in order to draw the metal piece out clear from the guides of the rolls before shifting it laterally, as hereinafter explained, I employ a hydraulic cylinder 40, (shown in Fig. 4,) set in horizontal position at the end of the shaft 32 and having its piston 41 fixed to or made integral with it, and I connect the shaft with the pinion 39 by a feather-and-spline or like connection, so that it may move through the hub of the pinion lengthwise, Figs. 4 and 6. For the same reason the shaft is also adapted to be movable longitudinally in its bearings; but it is fixed to the shifter so that the latter will partake of all its motions, both longitudinally and rotary. If the piston of the cylinder 40 be moved forwardly, it will move the shaft lengthwise in its bearings and will advance the shifter up to the rolls, and if it be moved back in the cylinder it will retract the shaft and will pull the end of the shifter away from the roll-guides. Instead of hydraulic cylinders motors of other types, such as electric motors, may be used for tipping the shifters and moving them lengthwise.

As thus constructed the operation of the mill is as follows: As stated above, the metal piece to be rolled having been sheared to the proper length by the blooming-mill shears 5 is carried by the feed-roller line 6 through the first pass of the rolls 2, and thence passes along the feed-roller line 7 until it comes to the frictionally-driven rollers of the line 7', along which it is conducted in an upwardly-inclined direction to the second pass in the rolls 3, whence it emerges and is delivered to the trough of the shifter 8; but as this shifter is not provided with feed-rollers as soon as the metal leaves the bite of the rolls its motion stops and its rear end still remains within the roll-guides. To withdraw it therefrom, the cylinder 40 pertaining to that shifter is then actuated, so as to draw the shaft 32 lengthwise in its bearings and to pull the shifter, with the metal piece thereon, away from and clear of the rolls and guides. Then the shifter is operated to turn the metal laterally and to deposit it upon the line 9, against the side plates thereof. The operation of the shifter will be understood from a description of the shifter 11, which is similarly constructed and is illustrated in Figs. 6 and 7. In using said shifter 11 water is admitted to the cylinder 36, so as to move the rack-bar 38 and to tip the shifter laterally, as shown by dotted lines. Such tipping first turns the metal over, so as to cause it to rest upon the side 30 of the shifter-trough, which is flat and of sufficient width to receive the metal in inverted position, and, second, it deposits it in such inverted position upon the lower line of rollers and against the side plate or guide thereof, after which by reverse motions of the cylinders the shifter is righted and moved back, so as to move its end toward the guides into position to receive the next piece. After leaving the shifter 8 the metal passes through the rolls 3, upon the roller-line 10 10', rising along the inclined portion 10', formed by the frictionally-driven rollers of progressively-larger diameters, and passing through the rolls 2 onto the shifter 11, which by operations like those described above pulls the metal out from the roll-guides and then is tipped, so as to deposit it upon the laterally-adjacent surface 12 of the lower rollers 20, whence the metal passes through the rolls 2, along the roller-surfaces 13 13', through the rolls 3, along the roller-surfaces 14, through the rolls 4, and along the roller-surfaces 15. Said line of rollers is crossed by the conveyers of a shifting mechanism 16, which is preferably constructed as described in my prior patent, No. 492,951, dated March 7, 1893, and by operation thereof the finished metal is transferred to the line of rollers 17, leading to the shears.

In the construction of the apparatus above cited it is new to employ a laterally-tilting shifter for transferring the metal from one table or line of rollers to one on a lower level and to turn it in its discharge, thus reversing the piece and freeing its surface from scale. It is also new to employ a shifter which receives the metal from the rolls and is then longitudinally movable to withdraw the metal from the guides of the roll-housing. It is new also to employ two or more sets of rolls in line with stationary tables of any construction for passing the metal alternately between the middle and bottom rolls of one set and the middle and top rolls of the next set, so that each stand of rolls becomes a feeder for the next stand, and a bead is given to the metal on both sides alternately, sharp edges and other difficulties of rolling being thus avoided. It is also new to employ a feed-table mechanism adapted to pass the metal in both directions on parallel lines back and forth between sets of rolls arranged in tandem and revolving in opposite directions, the table being adapted to convey the metal from the lower pass of one set to the upper pass of the other, and vice versa, whether the table be inclined or otherwise arranged to accomplish that purpose, and also to constitute such table by means of rollers (preferably frictionally driven) above the power-driven rollers, part of the table consisting of the line of frictionally-driven rollers and the other part consisting of the reversely-operating power-driven rollers. These features of my invention and other features specified in the claims I intend to cover broadly and severally irrespective of the construction of the other parts of the apparatus, as they may be changed in form or used in other combinations.

It will be noticed that the feed-roller lines 7 7', &c., are partly horizontal and partly inclined, and this construction is made the subject of specific claims. This construction has certain points of advantage. It is a better construction for accommodating the guide-rests and guides, and it is advantageous to receive the metal coming from the rolls on a horizontal surface rather than on an upwardly-inclined surface. The metal coming from the rolls has a tendency to drop at the ends and where not protected by an apron between the rollers tends to drop between them, but by having the table horizontal for a certain distance the tendency of the end to drop is checked and the metal will begin to ascend the incline much more easily and smoothly from the horizontal table than if it should pass upon the incline directly. Furthermore, the construction of the table is such that it enables me to drive the rollers with one horizontal counter-shaft, using the horizontal rollers to drive frictionally the rollers of the inclined part.

The broader claims of the specification are not limited to a construction arranged for passing the metal up the inclined surfaces of the feed-rollers as distinguished from passing it down the same; nor are they limited to the use of tables constituted of feed-rollers as distinguished from other forms of conveying mechanism. These constructions, which I show, however, being very valuable, are made the subject of more specific and separate claims.

The advantages of my invention will be apparent to those skilled in the art. The mill is compact and simple in construction. I can dispense with the use of the cumbrous and expensive lifting or traveling tables employed heretofore, since the frames of the tables described above need have no vertical motion. Much labor is therefore saved which heretofore has been required for operating the tables and handling the metal pieces. The operation is automatic and the feed-rollers may be driven continuously, so that the metal can be passed rapidly through the mill and a large output thus obtained. The number of stands of rolls is reduced to a minimum.

Within the scope of the invention as defined in the claims modifications may be made by the skilled mechanic, since·

What I claim is—

1. A rolling-mill plant comprising stationary lines of feed mechanism set side by side, and three-high rolls at the opposite ends thereof, said lines of feed mechanism being inclined in opposite directions and set so as to extend respectively between the lower roll-pass at one end and the upper pass at the other end.

2. A rolling-mill plant comprising stationary lines of feed mechanism set side by side, and three-high rolls at the opposite ends thereof, said lines of feed mechanism being inclined in opposite directions and set so as to extend respectively between the lower roll-pass at one end and the upper pass at the other end, there being only a single set of rolls at each end of the lines, and the several passes being formed in said single set of rolls.

3. A rolling-mill plant, comprising sets of rolls arranged in tandem, i. e., one in advance of the other and in the same line of feed, each roll of said sets having more than a single pass for the metal, and a feed-table between said sets of rolls in line with one or more but less than the whole number of passes, inclined from a lower pass of one set of rolls to a higher pass of the other set; substantially as described.

4. A rolling-mill plant comprising sets of rolls, set one in advance of the other, and a stationary inclined feed-table extending between a lower pass of one set of rolls and a higher level at the other set, means for shifting the metal laterally to a different level as it emerges from the rolls, and a second reversely-operating stationary line of feed mechanism, inclined in the opposite direction between the lower pass of one set of rolls and the upper pass of the next set.

5. A rolling-mill plant, comprising sets of rolls, set one in advance of the other, and a stationary inclined feed-table extending between a lower pass of one set of rolls and a higher level at the other set, means for shifting the metal laterally to a different level as it emerges from the rolls, a second reversely-operating stationary line of feed mechanism inclined in the opposite direction between the lower pass of one set of rolls and the upper pass of the next set, a second shifting device to transfer the metal again to a different level, and a third stationary line of feed mechanism also extending between the lower pass of the one set of rolls and the upper pass of the other set.

6. A rolling-mill plant, comprising sets of rolls, set one in advance of the other, and a stationary inclined feed-table extending in an upwardly-inclined direction from the lower pass of one set of rolls to the higher pass of the second set, a shifter set opposite to the last-named pass and adapted to shift the metal laterally to the level of the lower pass, and a second reversely-operating line of feed mechanism inclined in the opposite direction between said lower pass and the upper pass of the next set, said feed mechanism being adapted to convey the metal up the inclines.

7. A rolling-mill plant, comprising sets of rolls arranged in tandem, i. e., one in advance of the other and in the same line of feed, each roll of said sets having more than a single pass for the metal, and a feed-table between said sets of rolls in line with one or more but less than the whole number of passes, extending from a lower pass of one set of rolls to a higher pass of the other set, said table being substantially horizontal at its receiving end and thence inclined upwardly; substantially as described.

8. A rolling-mill plant comprising two sets of three-high rolls, set one in advance of the other, and each having upper and lower roll-passes, stationary feed mechanism inclined in opposite directions and leading from the lower pass of one to the upper pass of the next, and means at the outer sides of the rolls for receiving the metal and transferring it laterally from the pass out of which it emerges to a pass at a different level.

9. A rolling-mill plant comprising stationary lines of feed mechanism arranged side by side, and rolls at the opposite ends thereof, said lines of feed mechanism being inclined in opposite directions between the rolls to carry the metal from one level to another.

10. A rolling-mill plant, comprising stationary lines of feed-rollers arranged side by side, and rolls at the opposite ends thereof, said lines of feed-rollers being inclined in opposite directions and set so as to extend respectively between the lower roll-pass at one end and the upper pass at the other end.

11. A rolling-mill plant comprising sets of rolls arranged in tandem, i. e., one in advance of the other and in the same line of feed, and inclined feed-tables leading respectively in opposite directions from a lower pass of one set of rolls to a higher pass of the other set.

12. A rolling-mill plant comprising sets of rolls arranged in tandem, one in advance of the other and revolving in opposite directions, and feed mechanism extending between the rolls and adapted, respectively, to convey the metal from the lower pass of one set to the upper pass of the next set and vice versa.

13. In a rolling-mill, a rotatory shifter, comprising a receiving-plate, a flat lateral shelf or side plate extending at about a right angle to the receiving-plate, and mechanism for rotating the shifter on its longitudinal axis through an arc of about one hundred and twenty degrees, whereby the metal, on the rotation of the shifter, is first upturned against said shelf or side plate and is then discharged therefrom in inverted position to a lower level.

14. Feed-table apparatus comprising a lower line of feed mechanism, and a second line of feed mechanism consisting of a series of rollers extending in the same direction and driven frictionally from the mechanism of the lower line.

15. Feed-table apparatus for rolling-mills, comprising a series of rollers, and a second series of shorter rollers set parallel with the rollers of the first-named series at a different level and driven thereby in the opposite direction.

16. Feed-table apparatus comprising a lower table or line of feed mechanism, part of whose surface is exposed to carry the metal thereon, and a second line of feed mechanism consisting of frictionally-driven rollers, whose length is less than the width of the lower table.

17. Feed-table apparatus for rolling-mills, comprising a series of rollers, having a portion of their surfaces exposed to constitute one line of feed mechanism, and a second series of rollers set upon the same and of progressively-increasing diameters so as to constitute an inclined roller-surface.

18. Feed-table apparatus for rolling-mills, comprising a series of rollers having a portion of their surfaces exposed to constitute one line of feed mechanism, and a second series of rollers set upon the same and free to move vertically in their bearings into frictional contact therewith.

19. Feed-table apparatus for rolling-mills, comprising a series of rollers, and a second series of rollers parallel with the rollers of the first-named series, journaled on central shafts or axes removably set in side plates or supports, and bearing frictionally upon the first-named series of rollers.

20. The combination with rolls having upper and lower passes, of feed-table apparatus comprising at least three parallel lines of feed mechanism arranged in step fashion relatively to each other and in different vertical planes, two of the lines extending to one of the roll-passes and the other line to the other roll-pass.

21. A rolling-mill, having a shifter adapted to receive the metal as it emerges from the rolls, transfer it laterally to feed mechanism at a different level and to reverse it in the transfer, and means for imparting an initial longitudinal motion to the shifter.

22. The metal-shifter, comprising a trough set on a rotary shaft, by which it is rotatory through a partial revolution, and means for moving the shaft lengthwise.

23. The metal-shifter, comprising a trough set on a rotary shaft, by which it is rotatory through a partial revolution, a pinion on the shaft, and a rack meshing therewith and connected with the plungers of two oppositely-directed cylinders, one of which is of less cross-section than the other and is adapted to maintain the trough in upright position.

24. A shifter set opposite to the rolls from which it receives the metal, and means for moving the shifter lengthwise to withdraw the metal from the rolls.

25. A shifter set opposite to the rolls from which it receives the metal, means for moving the shifter lengthwise to withdraw the metal from the rolls, and means for tilting the shifter laterally.

26. A shifter, having a rotatory shaft, and a cylinder into which the shaft extends and by which it may be moved lengthwise.

27. The combination with rolls having upper and lower passes, of feed-table apparatus comprising at least three lines of rollers arranged in step fashion relatively to each other and in different vertical planes, two of said lines extending to one of the roll-passes, and the other line to the other roll-pass, said feed-table apparatus being substantially open above the lines of rollers to permit removal of metal.

In testimony whereof I have hereunto set my hand.

HENRY AIKEN.

Witnesses:
THOMAS W. BAKEWELL,
H. M. CORWIN.